( 12 ) United States Patent
Huang

(10) Patent No.: US 10,881,215 B2
(45) Date of Patent: Jan. 5, 2021

(54) DEVICE FOR PRODUCING RHYTHMIC MOVEMENT AND VIBRATING BED HAVING THE SAME

(71) Applicant: TUNG KENG ENTERPRISE CO., LTD., Taichung (TW)

(72) Inventor: Chia-Yen Huang, Taichung (TW)

(73) Assignee: TUNG KENG ENTERPRISE CO., LTD., Taichung (TW)

( * ) Notice: Subject to any disclaimer, the term of this patent is extended or adjusted under 35 U.S.C. 154(b) by 251 days.

(21) Appl. No.: 16/014,387

(22) Filed: Jun. 21, 2018

(65) Prior Publication Data

US 2019/0387894 A1 Dec. 26, 2019

(51) Int. Cl.
*A47C 21/00* (2006.01)
*F16F 15/04* (2006.01)
*F16F 15/12* (2006.01)

(52) U.S. Cl.
CPC .......... *A47C 21/006* (2013.01); *F16F 15/046* (2013.01); *F16F 15/1206* (2013.01);
(Continued)

(58) Field of Classification Search
CPC ........ A47C 21/006; F16F 15/00; F16F 15/02; F16F 15/04; F16F 15/046; F16F 15/12;
(Continued)

(56) References Cited

U.S. PATENT DOCUMENTS 1,567,818 A * 12/1925 Stebbins .................. 601/98
2,958,227 A * 11/1960 Peterson ............ B06B 1/10
74/61
(Continued)

FOREIGN PATENT DOCUMENTS

CN 107582266 A 9/2018
DE 102009015209 A1 * 10/2010 ........... B23K 20/121
(Continued)

OTHER PUBLICATIONS

Examination report for TW107115149, dated Nov. 12, 2018, Total of 10 pages.
(Continued)

*Primary Examiner* — Quang D Thanh
*Assistant Examiner* — Jacqueline M Pinderski
(74) *Attorney, Agent, or Firm* — Tracy M Heims; Apex Juris, PLLC.

(57) ABSTRACT

A reciprocating device applied to a load-bearing member includes a motor, an eccentric wheel, a first pulley disposed on a movable base of the load-bearing member, a first belt, and a recovery mechanism disposed on the movable base. The motor and the eccentric wheel are disposed on a fixed base of the load-bearing member. The eccentric wheel is connected to the motor to be driven to rotate around an eccentric shaft of the eccentric wheel. The first belt surrounds the eccentric wheel and the first pulley. The eccentric wheel is operatively coupled to the first pulley via the first belt. When the eccentric wheel is rotated by the motor, the first pulley and the movable base connected to the first pulley is operatively coupled to the eccentric wheel. The recovery mechanism provides a reverse force to the movable base according to said linkage.

4 Claims, 8 Drawing Sheets

(52) U.S. Cl.
CPC ........... *A61H 2201/0142* (2013.01); *A61H 2201/1215* (2013.01); *A61H 2201/1673* (2013.01)

(58) Field of Classification Search
CPC ...... F16F 15/1204–1206; F16F 15/121; A61H 2201/1215; A61H 2201/0142; A61H 2201/1673
USPC .. 601/1, 46, 49–51, 53–54, 97–98, 100–101
See application file for complete search history.

(56) References Cited

U.S. PATENT DOCUMENTS

| | | | | |
|---|---|---|---|---|
| 6,685,605 | B1* | 2/2004 | Klossner | A61H 1/02 482/142 |
| 2004/0210173 | A1* | 10/2004 | Swidler | A61H 1/008 601/49 |
| 2004/0230142 | A1* | 11/2004 | Park | A61H 23/0254 601/51 |
| 2019/0053969 | A1* | 2/2019 | Tait | A61H 1/005 |

FOREIGN PATENT DOCUMENTS

| | | |
|---|---|---|
| TW | M328870 U | 3/2008 |
| TW | M567093 U | 9/2018 |

OTHER PUBLICATIONS

Search report for TW107115149, dated Nov. 12, 2018, Total of 1 page.
English Abstract for CN107582266, Total of 1 page.
English Abstract for TWM328870, Total of 1 page.
English Abstract for TWM567093, Total of 1 page.

* cited by examiner

DEVICE FOR PRODUCING RHYTHMIC MOVEMENT AND VIBRATING BED HAVING THE SAME

BACKGROUND OF THE INVENTION

Technical Field

The present invention relates generally to a reciprocating device and a vibrating bed, and more particularly to a device for producing a rhythmic movement, which allows a load-bearing member to reciprocate, and a vibrating bed with the device for producing a rhythmic movement.

Description of Related Art

Modern people are busy and their exercise time is relatively reduced. Long-term lack of exercise makes people prone to chronic diseases, leading to a decline in the national health rate year by year. On the other hand, the social population has become elderly in recent years, and older people are often unable to exercise due to joint aging. Therefore, some manufacturers in the industry have developed a bed that can perform vertical or horizontal vibrations, so that people who do not exercise regularly or are unable to exercise can exercise at rest.

A conventional reciprocating device is disposed under a mattress of a horizontally vibrating bed, so that the mattress can move with the horizontal vibrations. Typically, the conventional reciprocating device uses a motor to drive a plurality of wheels to rotate, and a belt which surrounds the wheels drives the mattress or a frame below the mattress to swing back and forth horizontally. However, such a method requires the motor to drive the wheel to rotate in different directions, whereby to achieve a reciprocating effect. More specifically, when the motor drives the wheels to rotate clockwise, the belt is driven to move forward by the wheels, and the frame and the mattress move toward a head of the horizontal vibrating bed; when the motor drives the wheels to rotate in a counterclockwise direction, the belt is driven to move backward by the wheels, and the frame and the mattress move toward a tail of the horizontal vibrating bed, whereby to generate a reciprocation.

In addition, another conventional reciprocating device uses a motor to drive one of the wheels to rotate, and further uses a screw or a gear, which rotates with the wheel, to drive a frame that is operatively coupled to the screw or the gear to horizontally reciprocate. However, such a method also requires the motor to drive the wheel to rotate in different directions. In such a condition, the motor must switch the driving direction, and the wheel has to overcome an inertial rotation in a previous direction first, whereby to continuously rotate in an opposite direction. While switching the reciprocating direction, the rotation of the wheel is not easy to be smooth, so that the reciprocation is not smooth either, which may even cause equipment damage and increase maintenance cost.

Furthermore, there is still another conventional reciprocating device, which uses a connecting shaft to generate a horizontal reciprocation and uses a motor to control a wheel to continuously rotate in a single direction, wherein an end of the connecting shaft is connected to a frame, and another end thereof is pivotally connected to a wheel at a position deviated from a center of the wheel. In this way, the connecting shaft can be pushed and pulled by rotating the wheel in the single direction, and the frame can horizontally reciprocate. However, using the connecting shaft to achieve a reciprocating motion consumes too much kinetic energy on the connecting shaft, so that such reciprocating device has a large power consumption, which is not environmentally friendly.

Therefore, there is a need for the manufacturers to develop a new type of reciprocating device and vibrating bed to solve the aforementioned problems.

BRIEF SUMMARY OF THE INVENTION

In view of the above, the primary objective of the present invention is to provide a device for producing a rhythmic movement, which could be applied to a load-bearing member and could smoothly reciprocate the load-bearing member.

The present invention provides a reciprocating device, which is applied to a load-bearing member, wherein the load-bearing member has a fixed base and a movable base. The reciprocating device includes a motor, an eccentric wheel, a first pulley, a first belt, and a recovery mechanism, wherein the motor is disposed on the fixed base. The eccentric wheel is disposed on the fixed base and is connected to the motor, wherein the eccentric wheel has an eccentric shaft, and is driven by the motor to rotate around the eccentric shaft. The first pulley is disposed on the movable base. The first belt surrounds the eccentric wheel and the first pulley, wherein when the motor drives the eccentric wheel to rotate, the eccentric wheel is operatively coupled to the first pulley via the first belt, and the movable base is pulled by the first pulley. The recovery mechanism is disposed on the movable base, and provides a reverse force to the movable base in a direction that is opposite to a direction which the first pulley pulls the movable base.

In addition, the another primary objective of the present invention is to provide a vibrating bed, which could be smoothly reciprocated.

The present invention further provides a vibrating bed, which includes a fixed base, a movable base, and a reciprocating device, wherein the reciprocating device is disposed between the fixed base and the movable base and includes a motor, an eccentric wheel, a first pulley, a first belt, and a recovery mechanism. The motor is disposed on the fixed base. The eccentric wheel is disposed on the fixed base and is connected to the motor, wherein the eccentric wheel has an eccentric shaft, and is driven by the motor to rotate around the eccentric shaft. The first pulley is disposed on the movable base. The first belt surrounds the eccentric wheel and the first pulley, wherein when the motor drives the eccentric wheel to rotate, the eccentric wheel is operatively coupled to the first pulley via the first belt, and the movable base is pulled by the first pulley. The recovery mechanism is disposed on the movable base, and provides a reverse force to the movable base in a direction that is opposite to a direction which the first pulley pulls the movable base.

With the aforementioned design, the disclosure of the present invention could smoothly reciprocate the vibrating bed or the load-bearing member.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
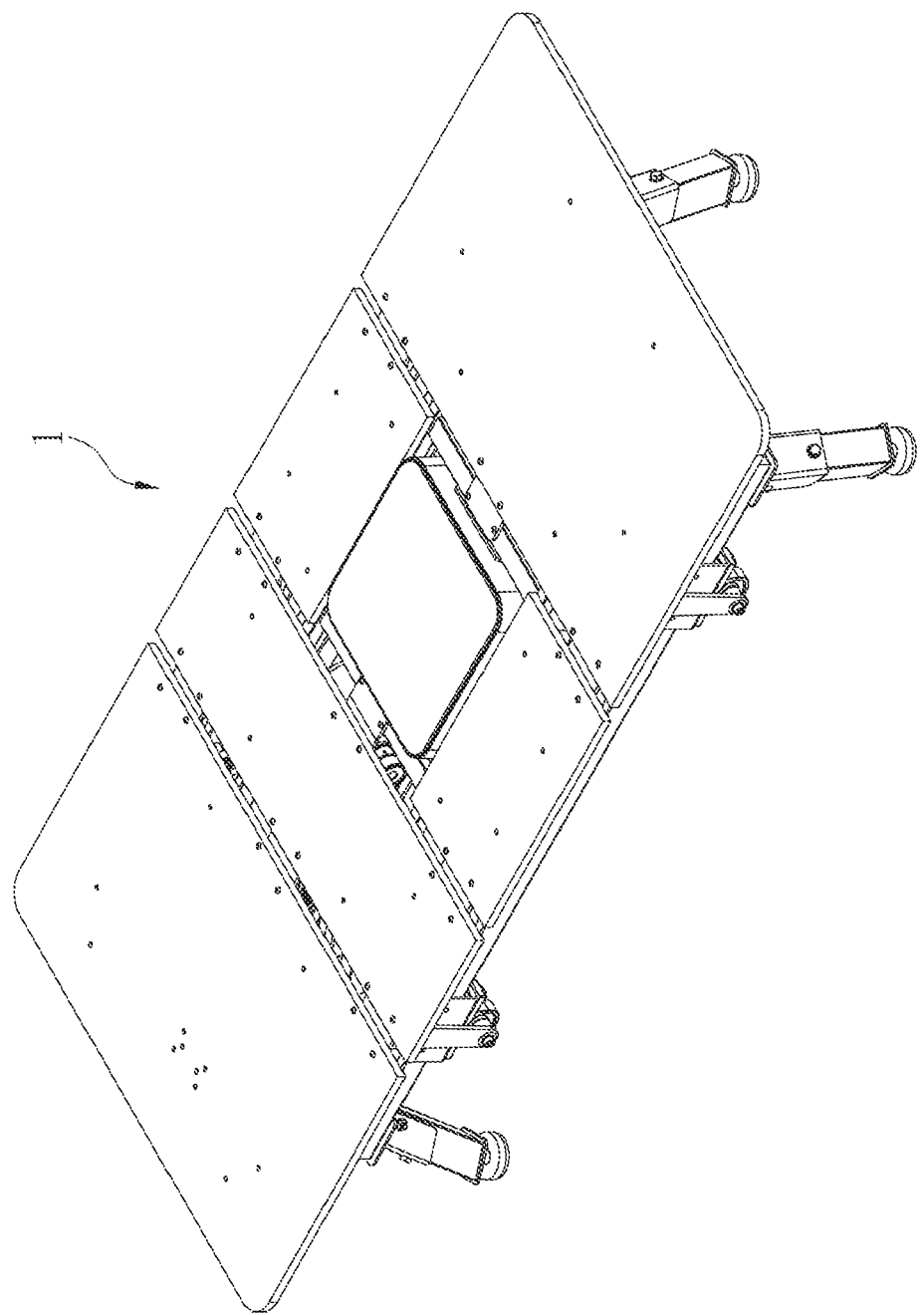
FIG. 1 is a schematic diagram of the vibrating bed of an embodiment according to the present invention.
Figure 2:
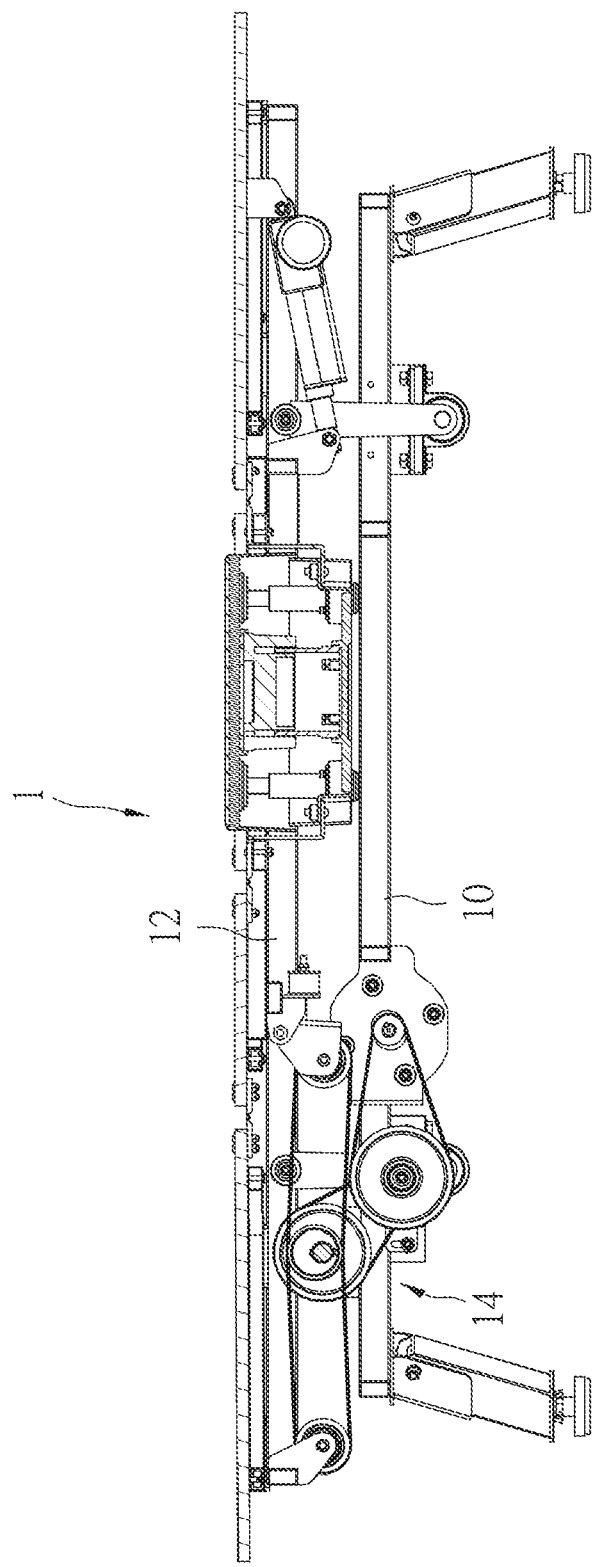
FIG. 2 is a sectional view of the vibrating bed shown in FIG. 1.

FIG. 1 is a schematic diagram of a vibrating bed 1 of an embodiment according to the present invention, and FIG. 2 is a sectional view of the vibrating bed 1 shown in FIG. 1. As shown in FIG. 1 and FIG. 2, the vibrating bed 1 includes a fixed base 10, a movable base 12, and a reciprocating device 14 which is disposed between the fixed base 10 and the movable base 12 for producing a rhythmic movement. In the current embodiment, the vibrating bed 1 could be used as a bed for medical treatment or health care, which allows the user to lie on it to be horizontally moved in a reciprocating manner. However, the vibrating bed 1 the current embodiment is not limited to be a vibrating bed for medical treatment or health care, but could be any load-bearing member with a similar structure or function. In practice, the vibrating bed 1 could also have a vertical vibration function.

Figure 3:
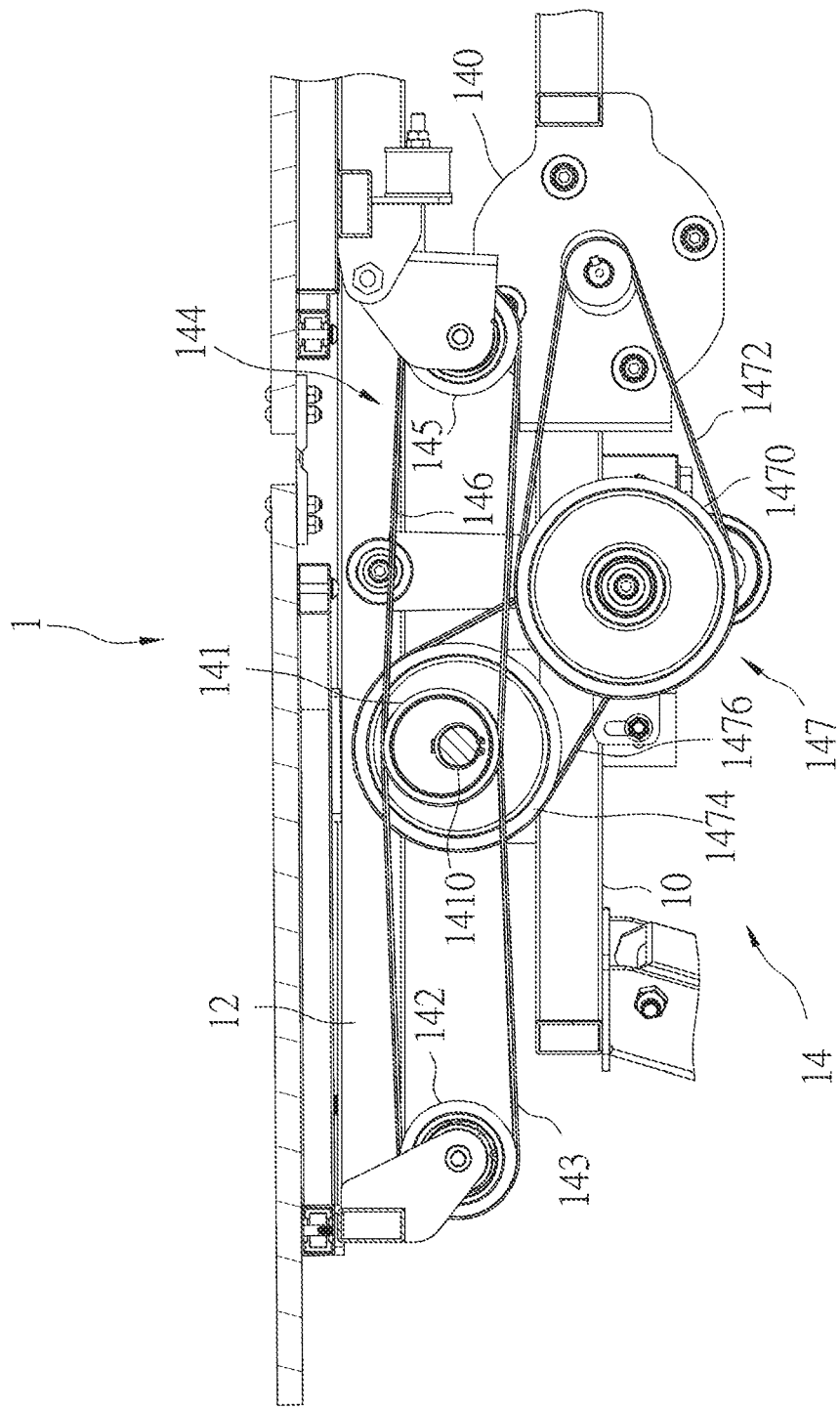
FIG. 3 is a partially schematic diagram of the vibrating bed shown in FIG. 2.
Figure 4:
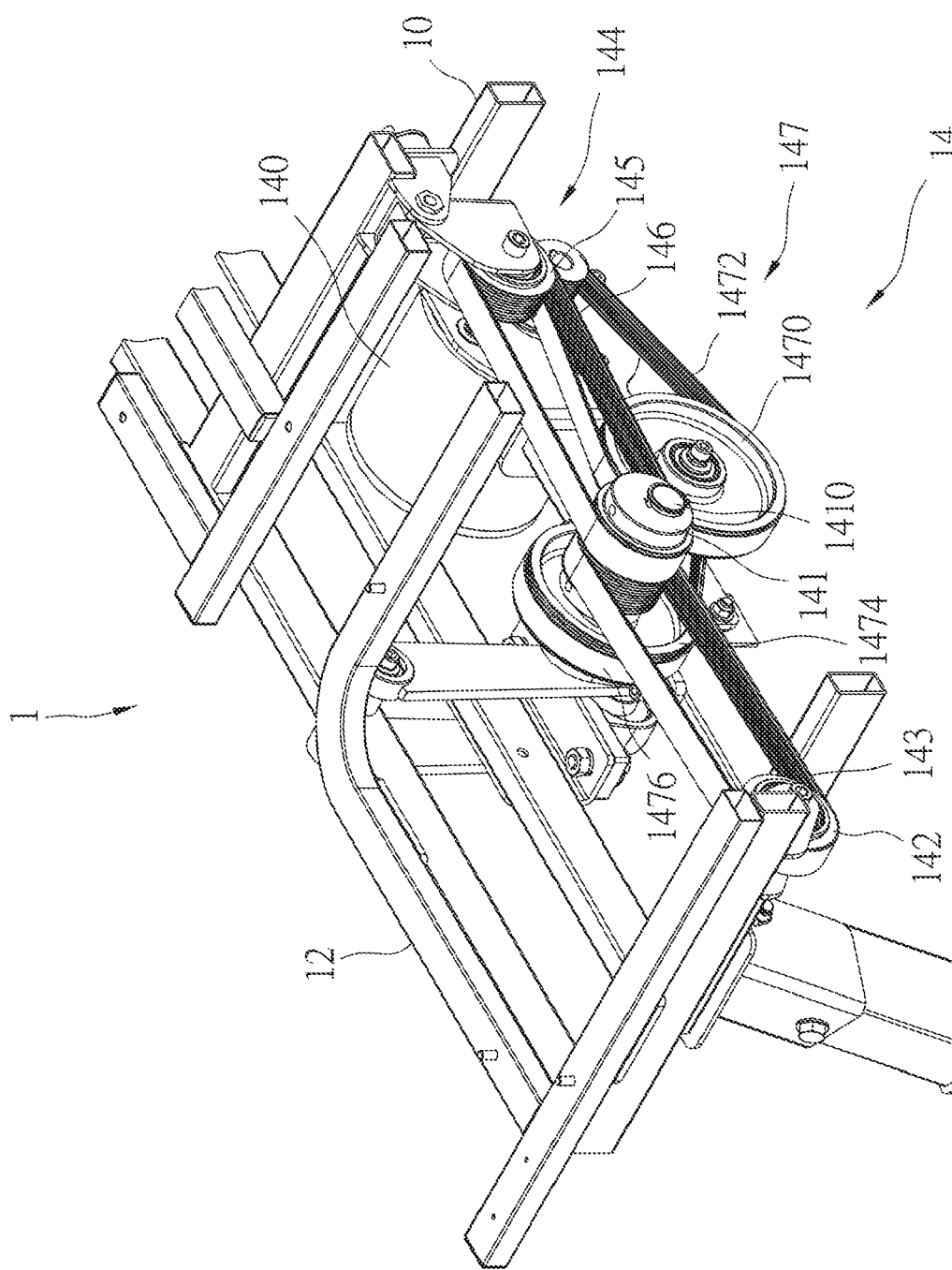
FIG. 4 is a partially schematic diagram of the vibrating bed, as seen from another direction of FIG. 2.

FIG. 3 is a partially schematic diagram of the vibrating bed 1 shown in FIG. 2, and FIG. 4 is a partially schematic diagram of the vibrating bed 1, as seen from another direction of FIG. 2. As shown in FIG. 3 and FIG. 4, the reciprocating device 14 has a motor 140, an eccentric wheel 141, a first pulley 142, a first belt 143, and a recovery mechanism 144, wherein the eccentric wheel 141 is disposed on the fixed base 10, and the first pulley 142 is disposed on the movable base 12. The first belt 143 surrounds the eccentric wheel 141 and the first pulley 142, so that the eccentric wheel 141 is operatively coupled to the first pulley 142 via the first belt 143. The eccentric wheel 141 is connected to the motor 140 and is driven by the motor 140 to rotate around an eccentric shaft 1410. Since the eccentric shaft 1410 of the eccentric wheel 141 is not an axial core, when the eccentric wheel 141 rotates around the eccentric shaft 1410 as a rotation axis, the wheel surface of the eccentric wheel 141 that is farthest from the eccentric shaft 1410 would abut against the first belt 143 to pull the first pulley 142. As shown in FIG. 3, when the wheel surface of the eccentric wheel 141 that is farthest from the eccentric shaft 1410 is rotated to be located on a right side of the eccentric shaft 1410, the first pulley 142 would be pulled rightward, and the movable base 12 would be also moved rightward. In the current embodiment, the position of the first pulley 142 is farther from a middle of the vibrating bed 1 than the eccentric wheel 141. However, the position of the first pulley 142 is not a limitation of the present invention. In practice, the first pulley could be disposed close to the middle of the vibrating bed.

In the current embodiment, the recovery mechanism 144 further includes a second pulley 145 and a second belt 146, wherein the second pulley 145 is disposed on the movable base 12 and is disposed opposite to the first pulley 142. The second belt 146 surrounds the second pulley 145 and the eccentric wheel 141, so that the eccentric wheel 141 is operatively coupled to the second pulley 145 via the second belt 146. Since the second pulley 145 and the first pulley 142 are oppositely disposed, the second pulley 145 could provide a reverse force in a direction that is opposite to the direction which the first pulley 142 pulls the movable base 12. It shall be noted that, the second belt 146 and the first belt 143 respectively surround different portions of the eccentric wheel 141, so that the second belt 146 and the first belt 143 do not interfere with each other.

As described above, when the eccentric wheel 141 is controlled by the motor 140 to rotate, the first pulley 142 could be moved together with the eccentric wheel 141 to move the movable base 12 in a first direction, and the second pulley 145 could be moved together with the eccentric wheel 141 toward a reverse direction, whereby to form a horizontally reciprocating performance.

Figure 5:
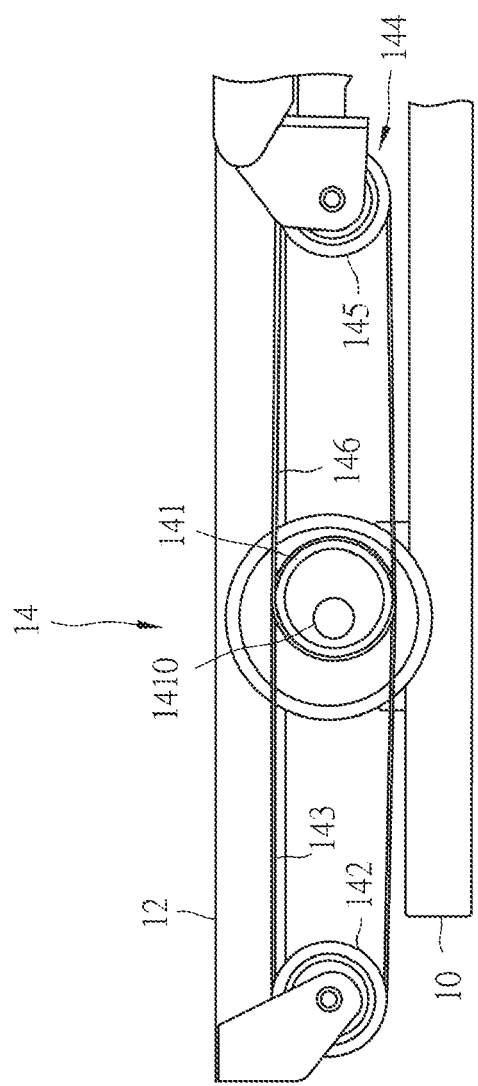
FIG. 5 is a schematic diagram of FIG. 3, showing the reciprocating device is operatively coupled to the movable base.
Figure 6:
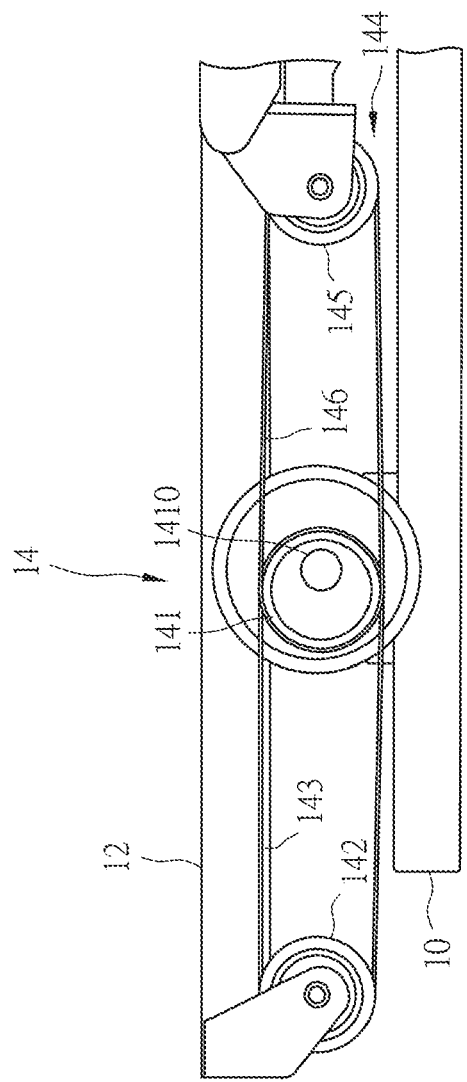
FIG. 6 is a schematic diagram of FIG. 3, showing the reciprocating device is operatively coupled to the movable base.

The operation between the reciprocating device 14 and the movable base 12 will be described in detail herein. FIG. 5 and FIG. 6 are schematic diagrams of FIG. 3, showing the reciprocating device 14 is operatively coupled to the movable base 12. As shown in FIG. 5, when the eccentric wheel 141 is driven by the motor 140 to rotate in a clockwise direction and the wheel surface of the eccentric wheel 141 that is farthest from the eccentric shaft 1410 is rotated to be located on the right side of the eccentric shaft 1410, the wheel surface of the eccentric wheel 141 abuts against the first belt 143, so that the first pulley 142 is pulled to move rightward. Since the first pulley 142 is disposed on the movable base 12, the movable base 12 would be pulled when the first pulley 142 is pulled, so that the movable base 12 could move rightward relative to the fixed base 10. At this time, since the eccentric wheel 141 does not abut against the second belt 146, the movable base 12 is not pulled by the second pulley 145. As shown in FIG. 6, when the eccentric wheel 141 continues to rotate in a clockwise direction and the wheel surface of the eccentric wheel 141 that is farthest from the eccentric shaft 1410 is rotated to be located on a left side of the eccentric shaft 1410, the wheel surface of the eccentric wheel 141 abuts against the second belt 146, so that the second pulley 145 is pulled to move leftward. Similarly, since the second pulley 145 is disposed on the movable base 12, the movable base 12 would be pulled when the second pulley 145 is pulled, so that the movable base 12 could move leftward relative to the fixed base 10. At this time, since the eccentric wheel 141 does not abut against the first belt 143, the movable base 12 is not pulled by the first pulley 142.

As described above, when the motor 140 drives the eccentric wheel 141 to rotate in a clockwise direction continuously, the movable base 12 of the vibrating bed 1 could be moved horizontally in reciprocating manner relative to the fixed base 10. In practice, the motor 140 could drive the eccentric wheel 141 to continuously rotate in a counterclockwise direction, the movable base 12 of the vibrating bed 1 could also be moved horizontally in reciprocating manner relative to the fixed base 10. Since the motor 140 only needs to drive the eccentric wheel 141 to continuously rotate in a single direction, and does not need to switch the direction of rotation, the reciprocating device 14 could provide a smoothly reciprocating movement, and the problems of the prior art could be solved, whereby the equipment could be prevented from damage, and the user could lie on the vibrating bed 1 more comfortable. In addition, by pulling the pulleys via the eccentric wheel 141 and the belts, it could prevent the kinetic energy provided by the motor 140 from being excessively consumed in directions other than the horizontal direction. In comparison with the reciprocating device of the prior art which uses a connecting shaft to generate a horizontal reciprocation, the reciprocating device of the present invention could save more power.

As shown in FIG. 3 and FIG. 4, in the current embodiment, the reciprocating device 14 further includes a transmission pulley assembly 147, which is adapted to connect the motor 140 and the eccentric wheel 141, wherein the transmission pulley assembly 147 includes a first transmission pulley 1470, a first transmission belt 1472, a second transmission pulley 1474, and a second transmission belt 1476. Both of the first transmission pulley 1470 and the second transmission pulley 1474 are disposed on the fixed base 10. The first transmission pulley 1470 is connected to the motor 140 via the first transmission belt 1472, and an axial core of the second transmission pulley 1474 is connected to the eccentric shaft 1410 of the eccentric wheel 141, so that the eccentric wheel 141 could rotate together with the second transmission pulley 1474. In addition, the second transmission belt 1476 surrounds the first transmission pulley 1470 and the second transmission pulley 1474, so that the first transmission pulley 1470 is operatively coupled to the second transmission pulley 1474. It shall be noted that, the first transmission belt 1472 and the second transmission belt 1476 respectively surround different portions of the first transmission pulley 1470, so that the first transmission belt 1472 and the second transmission belt 1476 do not interfere with each other.

When the motor 140 starts rotating to drive the first transmission belt 1472 to move, the first transmission belt 1472 drives the first transmission pulley 1470 to rotate. After that, the rotation of the first transmission pulley 1470 is transmitted to the second transmission pulley 1474 via the second transmission belt 1476, whereby to drive the second transmission pulley 1474 to rotate. In this way, the eccentric wheel 141, which is operatively coupled to the second transmission pulley 1474, is driven to rotate.

With the transmission pulley assembly 147, the motor 140 could be disposed at other portions of the vibrating bed 1, rather than being directly connected to the eccentric wheel 141. In this way, the configuration of the components of the reciprocating device 14 could be more flexible. In addition, the first transmission pulley 1470 could provide a deceleration and a buffering function, so that the vibrating bed 1 could reciprocate more smoothly.

Figure 7:
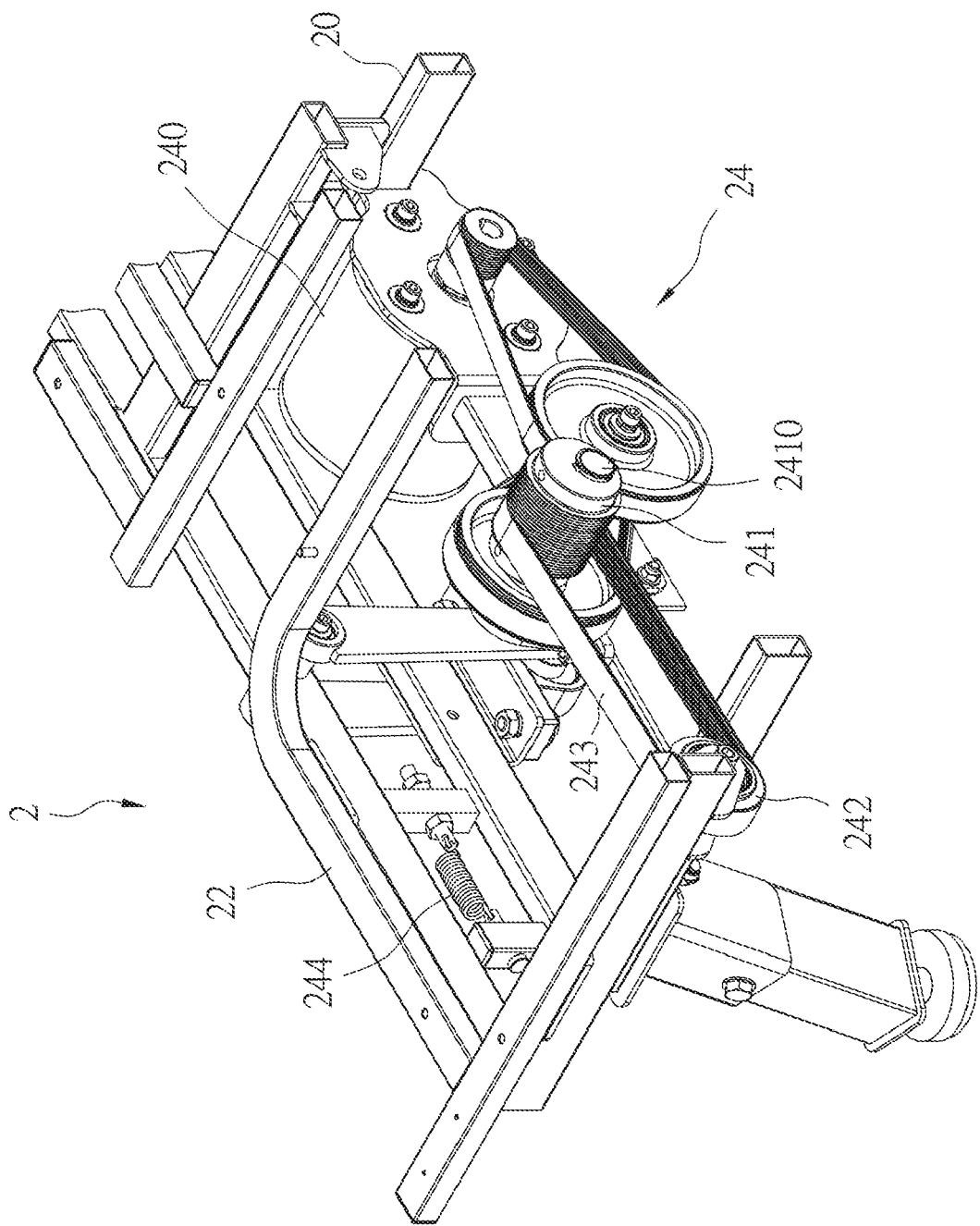
FIG. 7 is a partially schematic diagram of the vibrating bed of another embodiment according to the present invention.

In the current embodiment, the reciprocating device 14 could horizontally reciprocate relative to the fixed base 10 by utilizing the eccentric wheel 141 and the two opposite pulleys connected to the movable base 12 to move the movable base 12. However, the movable base is not limited to be moved by the eccentric wheel 141 and the pulleys. FIG. 7 is a partially schematic diagram of a vibrating bed 2 of another embodiment according to the present invention, and FIG. 8 is a partially schematic diagram of a vibrating bed 3 of still another embodiment according to the present invention.

As shown in FIG. 7, the vibrating bed 2 has almost the same structure as the vibrating bed 1 shown in FIG. 1, except that a recovery mechanism 244 includes a tension spring, wherein two ends of the tension spring are respectively connected to a fixed base 20 and a movable base 22. When a motor 240 drives an eccentric wheel 241 to rotate and a wheel surface of the eccentric wheel 241 farthest from an eccentric shaft 2410 is rotated to be located on a right side of the eccentric shaft 2410, the movable base 22 is pulled to move rightward. At this time, the tension spring is pulled to stretch by the movable base 22, so that the tension spring provides a leftward elastic reverse force to the movable base 22. When the motor 240 continues to drive the eccentric wheel 241 to rotate and the wheel surface of the eccentric wheel 241 farthest from the eccentric shaft 2410 is rotated to be located on a left side of the eccentric shaft 2410, a force of the eccentric wheel 241 pulling a first pulley 242 and the movable base 22 disappears. At this time, the movable base 22 could be pulled to move leftward by the elastic reverse force generated by the tension spring. After that, when the motor 240 continues to drive the eccentric wheel 241 to rotate and the wheel surface of the eccentric wheel 241 farthest from the eccentric shaft 2410 is rotated to be located on the right side of the eccentric shaft 2410 again, the movable base 22 could be pulled to move rightward as well. In this way, the vibrating bed 2 could horizontally reciprocate.

Figure 8:
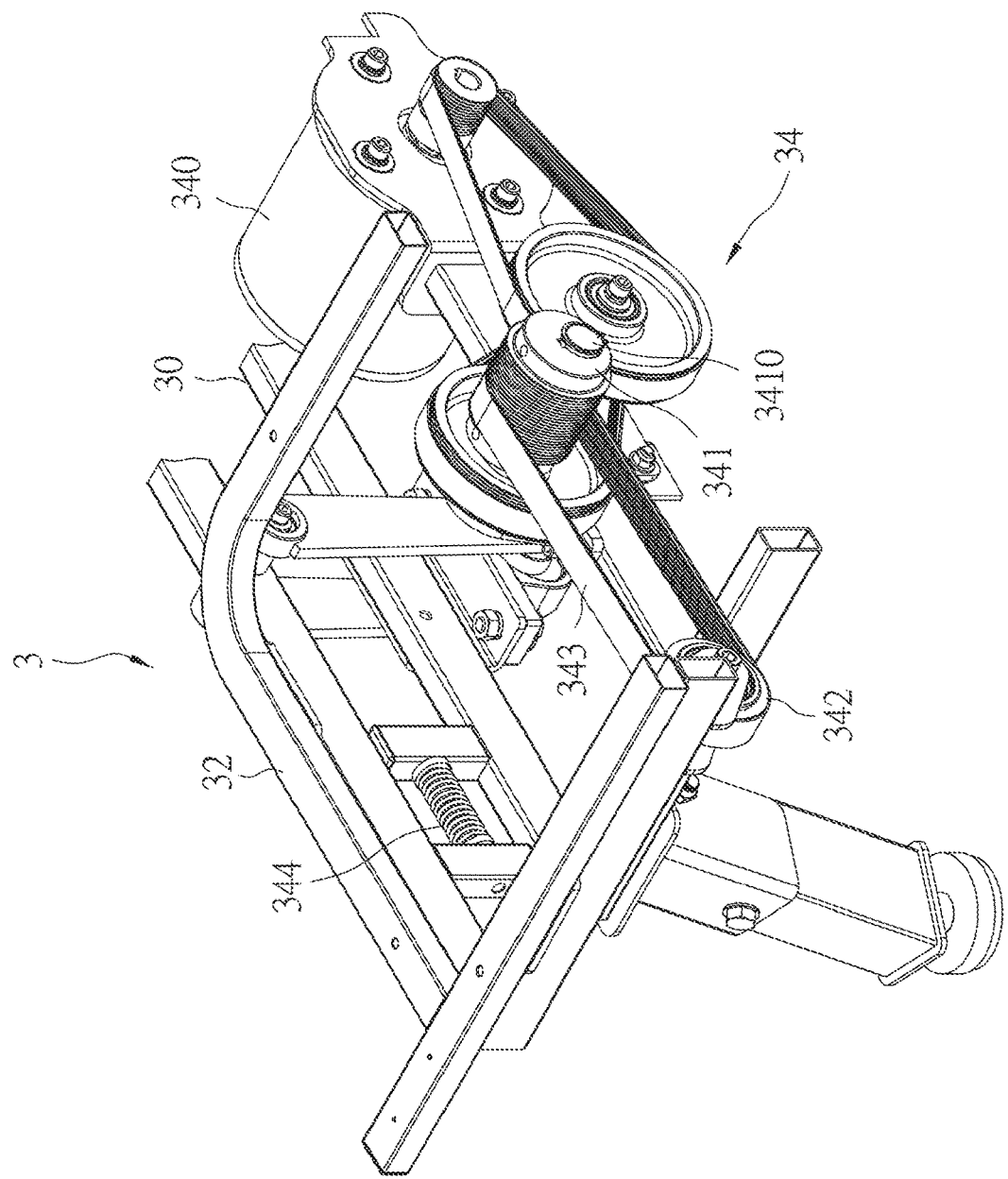
FIG. 8 is a partially schematic diagram of the vibrating bed of still another embodiment according to the present invention.

As shown in FIG. 8, the vibrating bed 3 has almost the same structure as the vibrating bed 2 shown in FIG. 7, except that a recovery mechanism 344 includes a compression spring, wherein two ends of the compression spring are respectively connected to a fixed base 30 and a movable base 32. Similarly, a motor 340 drives an eccentric wheel 341 to pull the movable base 32 to move, and the compression spring provides an elastic reverse force to the movable base 32 in a direction that is opposite to the direction which the eccentric wheel 341 pulls the movable base 32. When the eccentric wheel 341 rotates to a position in which the eccentric wheel 341 does not provide a force pulling the movable base 32, the elastic reverse force could pull the movable base 32 to move in the direction that is opposite to the direction which the eccentric wheel 341 pulls the movable base 32, thereby generating a horizontally reciprocating motion. The only difference between the vibrating bed 3 of the current embodiment and the vibrating bed 2 shown in FIG. 7 is the type of the spring and the connection between the spring and the fixed base and the movable base. However, the recovery mechanism is not limited to include a spring, but could include any elastic member which could provide an elastic reverse force in a direction opposite to the direction which the eccentric wheel pulls the movable base. What's more, the recovery mechanism could be any components that could provide a reverse force in a direction opposite to the direction which the eccentric wheel pulls the movable base. For instance, as shown in FIG. 3, the second pulley 145 and the second belt 146 provides a reverse force in a direction that is opposite to the direction which the first pulley 142 pulls the movable base 12.

It could be known from the aforementioned embodiments, the reciprocating device of the present invention has the eccentric wheel, the recovery mechanism, and the pulley which is connected to the eccentric wheel via the belt, wherein the motor drives the eccentric wheel to rotate in a single direction, whereby to horizontally reciprocate the vibrating bed or the load-bearing member. In this way, the vibrating bed or the load-bearing member could reciprocate smoothly, which reduces the chance of damage to the equipment and makes the user lying on the vibrating bed more comfortable. Additionally, in comparison with the reciprocating device of the prior art which generates a horizontal reciprocation by a connecting shaft, the reciprocating device of the present invention could save more power, providing a better environmental protection effect.

It must be pointed out that the embodiments described above are only some preferred embodiments of the present invention. All equivalent structures which employ the concepts disclosed in this specification and the appended claims should fall within the scope of the present invention.

What is claimed is:

1. A reciprocating device in combination with a load-bearing member, wherein the load-bearing member has a fixed base and a movable base; the reciprocating device comprising:
   a motor disposed on the fixed base;
   an eccentric wheel which is disposed on the fixed base and is connected to the motor, wherein the eccentric wheel has an eccentric shaft, and the eccentric wheel is driven by the motor to rotate around the eccentric shaft;
   a first pulley disposed on the movable base;
   a first belt which only surrounds the eccentric wheel and the first pulley to form a closed loop, wherein when the motor drives the eccentric wheel to rotate, the eccentric wheel is operatively coupled to the first pulley via the first belt, and the movable base is pulled by the first pulley; and
   a recovery mechanism which is disposed on the movable base, and provides a reverse force to the movable base in a direction that is opposite to a direction which the first pulley pulls the movable base;
   wherein the recovery mechanism further comprises a second pulley and a second belt; the second pulley is disposed on the movable base and is opposite to the first pulley; the second belt only surrounds the eccentric wheel and the second pulley to form another closed loop; the first belt and the second belt respectively surround different portions of the eccentric wheel such that the first belt and the second belt do not interfere with each other; when the motor drives the eccentric wheel to rotate, the eccentric wheel is operatively coupled to the second pulley and the movable base via the second belt.

2. The reciprocating device in combination with the load-bearing member of claim 1, further comprising a first transmission pulley, a first transmission belt, a second transmission pulley, and a second transmission belt; wherein the first transmission pulley is disposed on the fixed base; the first transmission belt surrounds the first transmission pulley, and is connected to the motor, so that the motor drives the first transmission pulley to rotate via the first transmission belt; the second transmission pulley is disposed on the fixed base, and has an axial core connected to the eccentric shaft, so that the eccentric wheel is rotated together with the second transmission pulley; the second transmission belt surrounds the second transmission pulley and the first transmission pulley, so that a rotation of the first transmission pulley is transmitted to the second transmission pulley to drive the second transmission pulley to rotate.

3. A vibrating bed, comprising:
   a fixed base;
   a movable base; and
   a reciprocating device which is disposed between the fixed base and the movable base, wherein the reciprocating device comprises:
   a motor disposed on the fixed base;
   an eccentric wheel which is disposed on the fixed base and is connected to the motor, wherein the eccentric wheel has an eccentric shaft, and the eccentric wheel is driven by the motor to rotate around the eccentric shaft;
   a first pulley disposed on the movable base;
   a first belt which only surrounds the eccentric wheel and the first pulley to form a closed loop, wherein when the motor drives the eccentric wheel to rotate, the eccentric wheel is operatively coupled to the first pulley via the first belt, and the movable base is pulled by the first pulley; and
   a recovery mechanism which is disposed on the movable base, and provides a reverse force to the movable base in a direction that is opposite to a direction which the first pulley pulls the movable base;
   wherein the recovery mechanism further comprises a second pulley and a second belt; the second pulley is disposed on the movable base and is opposite to the first pulley; the second belt only surrounds the eccentric wheel and the second pulley to form another closed loop; the first belt and the second belt respectively surround different portions of the eccentric wheel such that the first belt and the second belt do not interfere with each other; when the motor drives the eccentric wheel to rotate, the eccentric wheel is operatively coupled to the second pulley and the movable base via the second belt.

4. The vibrating bed of claim 3, wherein the reciprocating device further comprises a first transmission pulley, a first transmission belt, a second transmission pulley, and a second transmission belt; the first transmission pulley is disposed on the fixed base; the first transmission belt surrounds the first transmission pulley, and is connected to the motor, so that the motor drives the first transmission pulley to rotate via the first transmission belt; the second transmission pulley is disposed on the fixed base, and has an axial core connected to the eccentric shaft, so that the eccentric wheel is rotated together with the second transmission pulley; the second transmission belt surrounds the second transmission pulley and the first transmission pulley, so that a rotation of the first transmission pulley is transmitted to the second transmission pulley to drive the second transmission pulley to rotate.

* * * * *